Patented July 23, 1946

2,404,698

UNITED STATES PATENT OFFICE 2,404,698

INSECT REPELLENT COMPOSITION

Alfred Dreyling, South River, N. J., assignor to E. I. du Pont de Nemours & Company, Wilmington, Del., a corporation of Delaware No Drawing. Application January 4, 1945, Serial No. 571,357

10 Claims. (Cl. 167—30)

This invention relates to improved insect repellents and more particularly to insect repellent composition of jelly-like consistency.

Insect repellent compositions presently available are widely used with considerable effectiveness, especially in combating various types of mosquitoes. Great quantities of these materials are used by the armed forces operating in tropical zones where mosquito control is particularly imperative. These compositions are generally employed in liquid form. In this form, however, they are characterized by a serious defect in that the period of effectiveness is too short. Ordinarily the liquid repellent compositions are effective for less than 3 hours. Application, handling and shipping, wastage and undesirable stickiness also suggest the need for improvements in such products. Attempts have been made to prolong the effective period by additive ingredients designed to retard the volatilization rate of the active repellent components. Partial success as been achieved by preparing the compositions as emulsions or gels which may include water soluble colloids such as gum tragacanth, waxes, oils and cellulose esters. However, previous products of this type are objectionable because of the large amounts of additive ingredients required to form gels and because of appearance, excessive dirt collection, stickiness, oiliness, or instability during extended storage or at high temperatures where there is a tendency to liquefy or at low temperatures where there may be a tendency to crystallize.

This invention has as an object the provision of an improved insect repellent of jelly-like consistency. Another object is the provision of an insect repellent jelly which does not cause the skin to draw or stiffen. Another object of the invention is the provision of an improved insect repellent which is characterized by effectiveness for prolonged periods of time. Another object is the provision of an insect repellent jelly which is non-irritating to the skin. Another object is the provision of an improved insect repellent composition which permits the use of minimum amounts of additive non-repellent components, thus affording maximum protection against insect attacks. A further object is the provision of an insect repellent composition of smooth, jelly-like consistency which eliminates accidental spilling (as in the case of liquids) on furniture and clothing with resultant unsightly marring and in the case of some fabrics, a partial destruction. A further object is the provision of an improved insect repellent jelly which avoids waste since only the amount required need be applied thus distinguishing favorably from liquid repellent where there is greater wastage due to the application of excess material. A further object is the provision of a jelly-like insect repellent which affords greater ease of application and which is readily removed by washing with soap and water. A further object is the provision of insect repellents which are stable for extended storage periods and at low and high temperatures. A still further object is the provision of insect repellent compositions which may be packaged in durable containers such as collapsible tubes thereby avoiding breakage during shipping and storage handling, such as encountered with glass containers as generally used with liquid repellents. Other objects will appear as the description of the invention proceeds.

These objects are accomplished in accordance with the present invention by means of a composition of jelly-like consistency comprising at least one component repellent to insects and a plurality of at least partially immiscible cellulose derivatives, selected from the group consisting of cellulose esters, and cellulose ethers.

The following examples are given by way of illustration only and no limitations are intended thereby except as indicated in the appended claims.

Example 1

| | Per cent by weight |
|---|---|
| Ethyl cellulose | 2.7 |
| Cellulose acetobutyrate | 2.3 |
| Propylene glycol monostearate | 2.0 |
| Dimethyl phthalate | 55.8 |
| 2-ethyl hexane-1,3-diol (Rutgers 612) | 18.6 |
| Indalone [1] | 18.6 |
| | 100.0 |

[1] Alpha, alpha dimethyl alpha carbobutoxydihydro-gamma pyrone prepared by condensing butyl oxalate with mesityl oxide.

The ethyl cellulose used in this composition had a viscosity of 40,000 cps. determined in 5% concentration in a solvent vehicle consisting of 80 parts of toluene and 20 parts of ethyl alcohol. The ethoxyl content of the ethyl cellulose was 46.8 to 48.5%.

The viscosity of a 20% solution of the cellulose acetobutyrate dissolved in acetone was about 38″ determined in accordance with A. S. T. M. procedure D-301-33. This corresponds to about 2500 centipoises.

The composition was prepared by charging the ingredients into a paddle type mixer and agitating until a homogeneous mixture was secured.

The resulting composition had a smooth jelly-like consistency. Its mosquito repelling properties were satisfactory and it was found that its effectiveness in this respect was more than doubled in time as compared to the conventional liquid repellent containing the same active ingredients. Also it was observed that a lighter application could be used and that the objectionable oily condition common to the liquid repellent was eliminated in the new product. Furthermore, due to the discontinuous nature of the applied film as provided through the use of the two incompatible or immiscible cellulose derivatives, there was no drawing or stiffening of the skin.

Example 2

| | Percent by weight |
|---|---|
| Ethyl cellulose | 3.2 |
| Cellulose acetobutyrate | 2.8 |
| Dimethyl phthalate | 56.4 |
| 2-ethyl hexane-1,3-diol (Rutgers 612) | 18.8 |
| Indalone | 18.8 |
| | 100.0 |

It will be noted that this composition is similar to Example 1, except that the propylene glycol monostearate has been omitted.

The resulting properties are also similar to Example 1 and exhibit comparable superiority in the essential features including prolonged effectiveness after application to the skin.

Example 3

| | Percent by weight |
|---|---|
| Ethyl cellulose | 3.0 |
| Cellulose nitrate | 3.0 |
| Dimethyl phthalate | 56.4 |
| 2-ethyl hexane-1,3-diol | 18.8 |
| Indalone | 18.8 |
| | 100.0 |

The ethyl cellulose used in this composition was of the same type as that described in Example 1.

The cellulose nitrate had a nitrogen content of about 12% and a viscosity characteristic of 887 seconds determined in accordance with the procedure described in A. S. T. M. Spec. D–301–33. Formula A. This corresponds to about 330,000 centipoises.

This product exhibited properties similar to those described for Example 1.

Example 4

| | Percent by weight |
|---|---|
| Cellulose acetate | 2.5 |
| Cellulose nitrate | 3.0 |
| Glyceryl di-stearate | 0.5 |
| Dimethyl phthalate | 56.4 |
| 2-ethyl hexane-1,3-diol | 18.8 |
| Indalone | 18.8 |
| | 100.0 |

The cellulose nitrate used in this composition was of the same type as that described in Example 3.

The cellulose acetate had a combined acetic acid content of about 55% and a viscosity of about 100 seconds determined on a 20% concentration of the cellulose acetate in acetone and using the procedure described in A. S. T. M. specifications D–301–33. This corresponds to about 34,400 centipoises.

This product likewise, exhibited properties similar to those described for Example 1.

Example 5

| | Percent by weight |
|---|---|
| Ethyl cellulose | 3.0 |
| Cellulose acetate | 2.5 |
| Propylene glycol di-stearate | 0.5 |
| Dimethyl phthalate | 56.4 |
| 2-ethyl hexane-1,3-diol | 18.8 |
| Indalone | 18.8 |
| | 100.0 |

The ethyl cellulose used in this composition was of the same type as described in Example 1 and the cellulose acetate of the type described in Example 4.

The product of this example also afforded the desired properties previously described.

In addition to the cellulose derivatives disclosed in the preceding examples, other cellulose esters, mixed esters or ethers such as cellulose acetopropionate and benzyl cellulose which are soluble in organic solvents may also be used, provided there is substantial incompatibility or immiscibility between the cellulose derivatives, a condition which represents a basic requirement for the success of the present invention. In general, it is preferred to employ two cellulose derivatives which are substantially incompatible or immiscible in the final film and to use such materials in approximately equal amounts. This proportion may be varied considerably but it must be maintained in such relationship that a final film which is discontinuous in character will result.

The viscosity characteristic of the cellulose derivatives used in the products of the invention is important. It is necessary that only high viscosity types be employed to afford the desired consistency in the final product and maintain the maximum initial effectiveness in repellent action by including only the minimum in non-active ingredients. In Example 1, it is shown that a cellulose acetobutyrate with a viscosity characteristic of about 2500 centipoises determined in a 20% solution in acetone may be used satisfactorily. However, in order to meet the basic conditions of proper consistency in the final product combined with low non-repellent ingredient content, it is necessary when using one cellulose derivative of this relatively low viscosity characteristic to include as the other cellulose derivative one which has a much higher viscosity characteristic such as suggested in Example 1 where the second cellulose derivative is ethyl cellulose with a viscosity many times higher than that of the cellulose acetobutyrate.

In general, the combined cellulose derivative content should be about 5 to 6% by weight of the total composition. The preferred viscosity of the final product is about 300,000 centipoises although suitable compositions may be prepared with viscosities between about 200,000 and 500,000 centipoises. The total cellulose derivative content may be varied preferably from about 1% to 10% by weight of the total composition depending upon the viscosity characteristic of the cellulose derivatives. Thus if dynamite type cellulose nitrate which has a very high viscosity characteristic is used, the amount of cellulose derivative may be as little as about 1% and still maintain the desired gel-like consistency. The proper consistency may likewise be maintained with amounts of cellulose derivatives as high as about 25% with proper adjustment in the use of the lower viscosity material. The higher concentrations of cellulose derivatives tend to reduce the overall repellent effectiveness and it is therefore preferred to employ concentrations of cellulose derivatives of not over about 6% for most purposes.

The examples include three components having insect repellent properties since this combination (dimethyl phthalate "Rutgers 612" and "Indalone" in the ratio of 3:1:1) has already demonstrated its effectiveness in the field, particularly as a mosquito repellent. However, for some purposes, this ratio may be varied considerably or only one or if desired two of these components may be employed. For example, dimethyl phthalate has proven to be quite useful as a repellent and may be substituted wholly for the other repellent components. Also, other materials having properties repellent to insects may be substituted for or used in conjunction with the repellent components previously suggested.

In the examples, the cellulose derivatives are soluble in at least one of the repellent components, particularly the dimethyl phthalate and consequently when agitated in this described medium become colloided to form the jelly-like consistency described. The addition of other solvents which may if desired be of the more volatile type is not precluded since the invention is operable under such conditions provided the amount of added solvent does not destroy the desired jelly-like consistency and provided also that the solvent added does not destroy the incompatibility of the cellulose derivatives.

Some of the preceding examples provide for the use of glyceryl di-stearate or propylene glycol di-stearate. The use of these ingredients is optional but they are of advantage in rendering the composition more easily removed by washing with soap and water. Furthermore, they contribute somewhat in reducing the objectionable greasy appearance caused by certain of the repellent components.

The products of the invention are generally useful for application to exposed portions of the skin for the purpose or repelling insects and more particularly various types of mosquitoes. Thus the compositions find particular utility in tropics especially in the armed forces stationed in such areas under circumstances where there is very little or no other protection against mosquitoes.

The unique results obtained in the improved products as afforded largely through the discontinuous nature of the applied film may be attributed to the combination of a plurality of cellulose derivatives which are at least partially incompatible or immiscible with each other in the final film thus providing discontinuity. This combination also contributes to the "shortness" of the gel thus improving application properties. The gel-like structure of the cellulose derivative colloids function to retard volatilization of the active repellent components thereby markedly prolonging the effectiveness of the insect repellent properties.

The new compositions are characterized by numerous important advantages chief of which is the desired prolongation of the effectiveness after application of the repellent activity which has by the present invention been extended to more than double that of the conventional liquid type insect repellents. The improved gel-like repellents are distinguished by ease of application, reduction in greasy feel and avoidance of wastage since no excess is applied as in the case of the liquid products. Problems of spillage, handling and storage such as encountered with liquid products which are frequently packaged in glass containers are avoided in the new composition since collapsible metal tubes are satisfactory containers. Marring of furniture and destruction of certain fabrics which are attacked by some repellent ingredients through accidental spilling are avoided with the compositions of the present invention. The improved repellents are stable at high or low temperatures for extended storage periods and do not crystallize or liquefy at temperature extremes. They are readily removed by washing with soap and water.

It is apparent that many widely different embodiments of the invention may be made without departing from the spirit and scope thereof; and, therefore, it is not intended to be limited except as indicated in the appended claims.

I claim:

1. A non-aqueous insect repellent composition of gel-like consistency substantially free from highly volatile solvents comprising a plurality of cellulose derivatives selected from the group consisting of cellulose esters and cellulose ethers and at least one non-volatile insect repellent which is a solvent for the cellulose derivatives separately, the said cellulose derivatives being incompatible when combined in the said repellent whereby a gel-like consistency is obtained.

2. The composition of claim 1 in which the cellulose derivatives are ethyl cellulose and cellulose acetobutyrate.

3. The composition of claim 1 in which the insect repellent is dimethyl phthalate.

4. The composition of claim 1 in which one of the cellulose derivatives is ethyl cellulose and the other is a cellulose ester.

5. The composition of claim 1 in which the final viscosity is between 200,000 and 500,000 centipoises.

6. The composition of claim 1 in which the cellulose derivatives are present in an amount between about 1% and 10% by weight of the total composition.

7. The composition of claim 1 in which the cellulose derivatives are present in an amount of about 6% by weight of the total composition.

8. The composition of claim 1 in which the cellulose derivatives consist of ethyl cellulose and a cellulose ester in approximately equal proportions.

9. An insect repellent composition of gel-like consistency comprising dimethyl phthalate, 2-ethyl hexane-1,3-diol, Indalone, ethyl cellulose, cellulose acetobutyrate and propylene glycol monostearate.

10. An insect repellent composition of gel-like consistency having the following composition by weight:

| | Percent |
|---|---|
| Ethyl cellulose | 2.7 |
| Cellulose acetobutyrate | 2.3 |
| Propylene glycol monostearate | 2.0 |
| Dimethyl phthalate | 55.8 |
| 2-ethyl hexane-1,3-diol | 18.6 |
| Indalone | 18.6 |

ALFRED DREYLING.